United States Patent
Stolzman

Patent Number: 6,050,545
Date of Patent: Apr. 18, 2000

[54] BULK CONTAINER VALVE

[76] Inventor: Michael D. Stolzman, c/o International Precision Components Corporation 28468 N. Ballard Dr., Lake Forest, Ill. 60045

[21] Appl. No.: 09/010,018

[22] Filed: Jan. 21, 1998

[51] Int. Cl.[7] .................................................. F16K 5/00
[52] U.S. Cl. ................... 251/315.05; 251/144; 251/148; 251/288; 251/315.01; 285/410; 285/411; 285/413; 285/415
[58] Field of Search .................... 251/315.01, 315.05, 251/315.14, 144, 288, 148; 285/411, 410, 413, 415

[56] References Cited

U.S. PATENT DOCUMENTS

| | | |
|---|---|---|
| 2,788,016 | 4/1957 | Scherer . |
| 3,192,948 | 7/1965 | Anderson et al. .................. 251/315.05 |
| 3,227,180 | 1/1966 | Tissot-Dupont ........................ 251/367 |
| 3,318,569 | 5/1967 | Manor . |
| 3,356,333 | 12/1967 | Scaramucci ........................ 251/315.05 |
| 3,373,968 | 3/1968 | Scaramucci ........................... 251/148 |
| 3,462,120 | 8/1969 | Priese . |
| 3,561,730 | 2/1971 | Hurst ..................................... 251/152 |
| 3,635,439 | 1/1972 | McNally ............................ 251/315.14 |
| 3,677,514 | 7/1972 | Mencarelli . |
| 3,678,956 | 7/1972 | Ebin ................................... 251/315.14 |
| 3,722,856 | 3/1973 | Koch et al. ............................. 251/152 |
| 3,722,859 | 3/1973 | Murphy et al. . |
| 3,948,480 | 4/1976 | Paptzun et al. .................... 251/315.05 |
| 4,099,705 | 7/1978 | Runyan . |
| 4,177,832 | 12/1979 | Price . |
| 4,177,972 | 12/1979 | Legris ................................ 251/315.14 |
| 4,206,904 | 6/1980 | Dante ................................ 251/315.14 |
| 4,218,042 | 8/1980 | Eckel ................................. 251/315.14 |
| 4,397,445 | 8/1983 | Burquier . |
| 4,527,771 | 7/1985 | Yeary . |
| 4,540,157 | 9/1985 | Kawanami ............................. 251/367 |
| 4,552,335 | 11/1985 | Alexander et al. . |
| 4,557,461 | 12/1985 | Gomi et al. . |
| 4,603,887 | 8/1986 | Mayfield et al. ....................... 285/410 |
| 4,815,701 | 3/1989 | Stone ................................ 251/315.01 |
| 4,887,794 | 12/1989 | Oliver et al. ....................... 251/315.14 |
| 5,102,098 | 4/1992 | Daghe et al. ...................... 251/315.14 |
| 5,104,092 | 4/1992 | Block et al. ....................... 251/315.05 |
| 5,141,018 | 8/1992 | Guterman .......................... 251/315.05 |
| 5,165,658 | 11/1992 | Spears et al. ..................... 251/315.14 |
| 5,429,151 | 7/1995 | Millett et al. ........................... 251/152 |
| 5,595,217 | 1/1997 | Gillen et al. . |
| 5,673,896 | 10/1997 | Gillen . |

FOREIGN PATENT DOCUMENTS

| | | |
|---|---|---|
| 28 07 913 | 8/1979 | Germany . |
| 497136 | 8/1954 | Italy . |

*Primary Examiner*—A. Michael Chambers
*Assistant Examiner*—Thomas L. McShane
*Attorney, Agent, or Firm*—Wook, Phillips, VanSanten, Clark & Mortimer

[57] ABSTRACT

There is disclosed herein a bulk container valve adapted for use with a bulk container having a tubular spout. The valve comprises a plastic housing having an interior chamber connecting a front port to a rear port. The housing includes a rear fitting about the rear port for connection to the spout, in use, and a front fitting about the front port. A generally spherical valve element is rotationally supported in the interior chamber for movement between a valve open position and a valve closed position. A handle includes a stem. The stem extends through an opening in the housing and is operatively mated with the valve element for selective rotation of the valve element. A fastener is secured to the stem within the interior chamber for securing the handle to the housing.

20 Claims, 5 Drawing Sheets

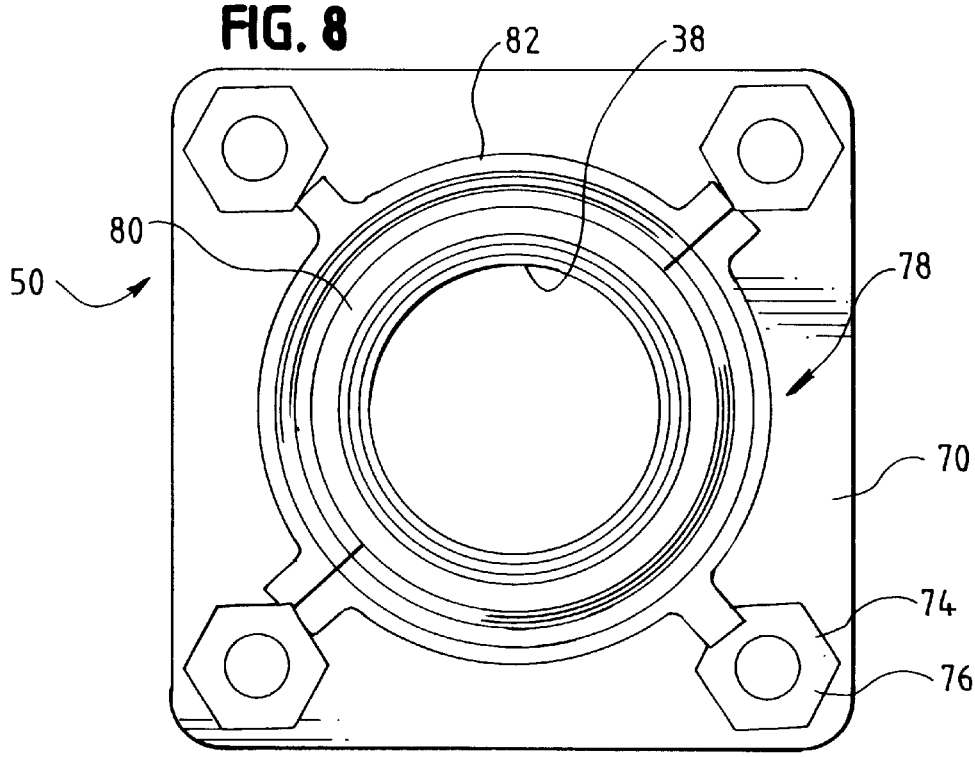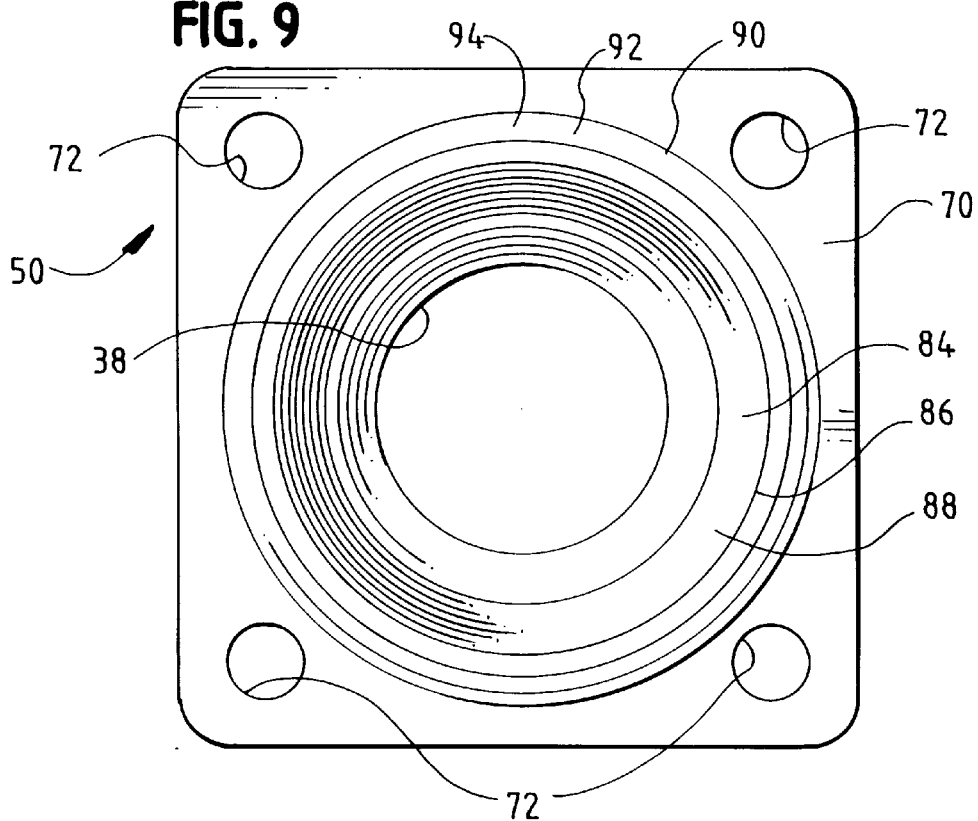

BULK CONTAINER VALVE

FIELD OF THE INVENTION

This invention relates to intermediate bulk storage containers and, more particularly, to an improved bulk container valve for use therewith.

BACKGROUND OF THE INVENTION

For shipment of bulk goods, a storage system known as an intermediate bulk container (IBC) has found wide acceptance. The IBC comprises a 275 gallon container mounted to a skid or pallet. A wire mesh cage is also mounted to the skid and surrounds the container on all four sides. The top of the container is generally exposed. Additional pallets or IBCs can then be stacked for shipping or storage.

The IBC is filled at its top by removing a cover providing access to an opening. A bottom spout acts as an outlet for goods stored in the vessel. A bulk container valve is typically removably secured to the IBC to control removal of goods from the container. Typically, the valve is threaded onto the spout. A hose can then be connected to the valve with a cam lever coupling to empty the contents of the IBC.

A typical EBC valve comprises a ball valve including a plastic housing with a ball valve element contained within the housing. A stem connects the ball valve element to a handle. Typically, the handle is secured to the stem with an external bolt. However, such a bolt can be easily removed, causing the handle to fall off. As is apparent, without the handle the valve would be extremely difficult to operate.

Likewise, the typical valve housing is of two-piece construction. The pieces are separated to provide access to the interior chamber to install the ball valve element. While the ball valve element is sealed within the interior chamber, the chamber includes substantial voids between the ball valve element and the walls of the chamber. In food application, food can enter these voids and subsequently rot. Likewise, if the IBC is used for storing chemicals, then the chemicals might set up within the voids.

A typical IBC valve includes a threaded collar connected to a rear fitting for threading the valve to the spout. The fitting is made of two-piece die cast metal. This can increase the weight of the valve significantly.

The present invention is directed to solving one or more of the problems discussed above in a novel and simple manner.

SUMMARY OF THE INVENTION

In accordance with the invention there is provided a bulk container valve in which the handle is secured to the housing internally of the interior chamber.

Broadly, there is disclosed herein a bulk container valve adapted for use with a bulk container having a tubular spout. The valve comprises a plastic housing having an interior chamber connecting a front port to a rear port. The housing includes a rear fitting about the rear port for connection to the spout, in use, and a front fitting about the front port. A valve element is rotationally supported in the interior chamber for movement between a valve open position and a valve closed position. A handle includes a stem. The stem extends through an opening in the housing and is operatively mated with the valve element for selective rotation of the valve element. A fastener is secured to the stem within the interior chamber for securing the handle to the housing.

It is a feature of the invention that the fastener comprises a U-shaped metal clip extending around a slot on the stem.

It is another feature of the invention that the housing comprises a two-piece housing having a front housing part and a rear housing part. A plurality of nuts and bolts secure the front housing part to the rear housing part. The nuts and bolts are inset in counterbores provided in flanges of the front housing part and the rear housing part. An O-ring seal is disposed between the front housing part and the rear housing part to seal the interior chamber.

It is a further feature of the invention that an O-ring seal surrounds the stem within the opening.

It is another feature of the invention to provide a stop on the housing extending into a groove in the handle for limiting rotational movement of the handle. The groove is narrower at a central portion to provide an over-center locking arrangement of the handle on the housing.

In accordance with another aspect of the invention there is disclosed a bulk container valve comprising a two-piece plastic housing having a front housing part and a rear housing part defining an interior chamber connecting a front port to a rear port. The front housing part includes a front flange connecting a cylindrical wall to a front fitting about the front port. The cylindrical wall surrounds a counterbore. The rear housing part includes a rear flange mateable with the front flange and connected to a rear fitting about the rear port for connection to the spout, in use, the rear flange having a tubular sleeve extending into the counterbore to reinforce the front housing part. A generally spherical valve element is rotationally supported in the interior chamber captured between the counterbore and the tubular sleeve for movement between a valve open position and a valve closed position. A handle is operatively mated with the valve element for selective rotation of the valve element. Securing means secure the front flange to the rear flange to maintain the valve in assembled condition.

It is another feature of the invention that the counterbore is generally spherical and the sleeve includes a spherical interior surface wherein the interior chamber provides minimal internal void surrounding the valve element.

In accordance with a further aspect of the invention there is disclosed a bulk container valve comprising a plastic housing having an interior chamber connecting a front port to a rear port. The housing includes a rear fitting about the rear port for connection to the spout, in use, and a front fitting about the front port. The rear fitting comprises a tubular neck mateable with the spout. A valve element is rotationally supported in the interior chamber for movement between a valve open position and a valve closed position. A handle is operatively mated with the valve element for selective rotation of the valve element. A plastic collar surrounds and is rotatably secured to the tubular neck. The collar has threads engageable with corresponding threads on the spout for securing the valve to the container.

It is another feature of the invention that the collar comprises a two-piece plastic collar and further comprising means for securing the two-pieces of the collar surrounding the neck.

It is an additional feature of the invention that the collar has an inwardly directed flange engaging an annular ridge on the neck to secure the collar to the neck.

It is yet a further feature of the invention that the collar is of glass-filled nylon construction.

Further features and advantages of the invention will be readily apparent from the specification and from the drawing.

BRIEF DESCRIPTION OF THE DRAWING

FIG. 8 is a rear elevation view of a rear housing part of the valve of FIG. 2; and FIG. 9 is a front elevation view of the rear housing part of FIG. 8.

DETAILED DESCRIPTION OF THE INVENTION

Figure 1:
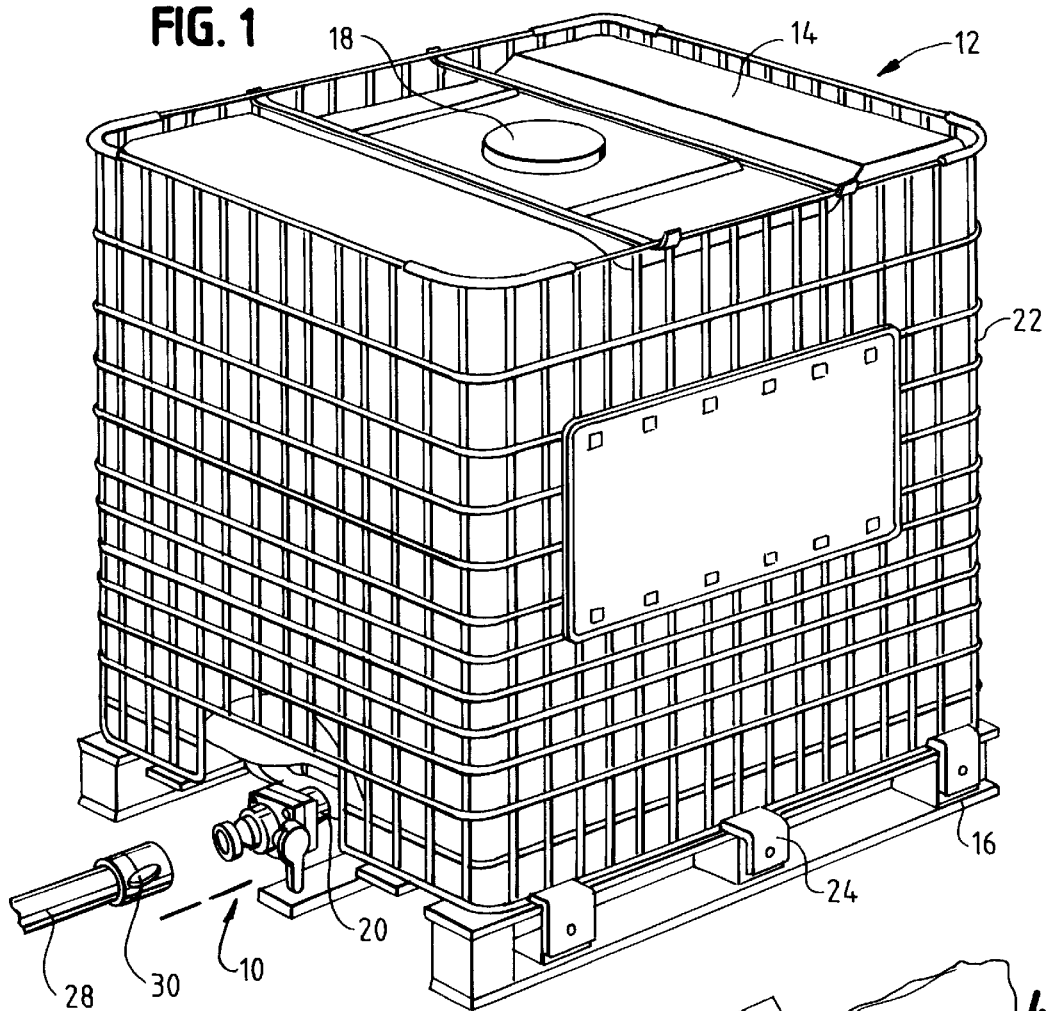
FIG. 1 is a perspective view of an intermediate bulk container (IBC) including a valve according to the invention.
Figure 2:
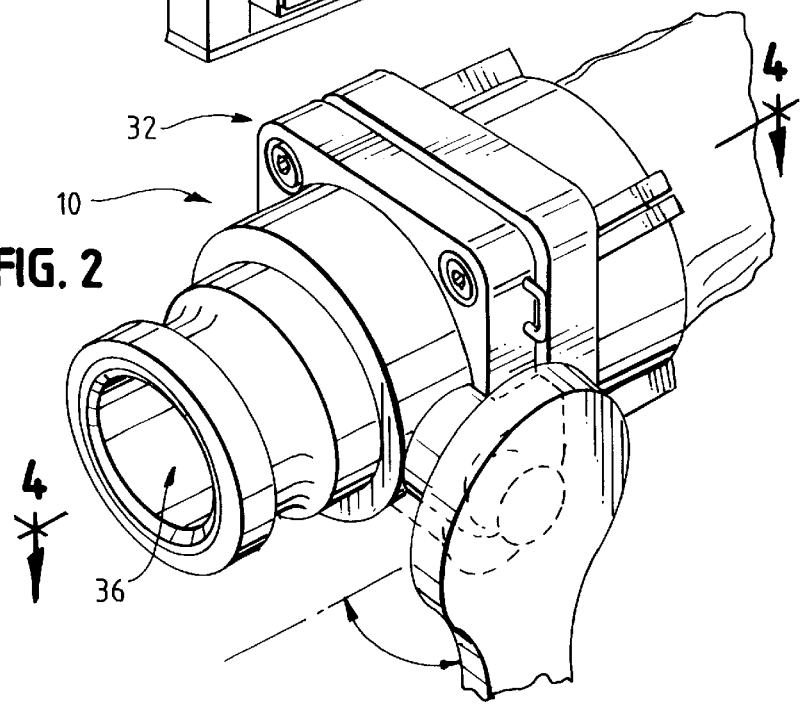
FIG. 2 is an enlarged, partial perspective view of the valve according to the invention shown connected to a spout of the IBC.

Referring to FIG. 1, a bulk container valve 10 according to the invention is illustrated mounted to an intermediate bulk container (IBC) 12. The IBC comprises a 275-gallon plastic vessel 14 resting on a pallet or skid 16. The container 14 can be filled at its top as by removing a cover 18 providing access to an opening (not shown). A bottom spout 20 acts as an outlet for goods stored in the vessel 14. The vessel 14 is surrounded on all four sides by a wire mesh cage 22. The cage 22 is secured to the pallet 16 using brackets 24.

Figure 4:
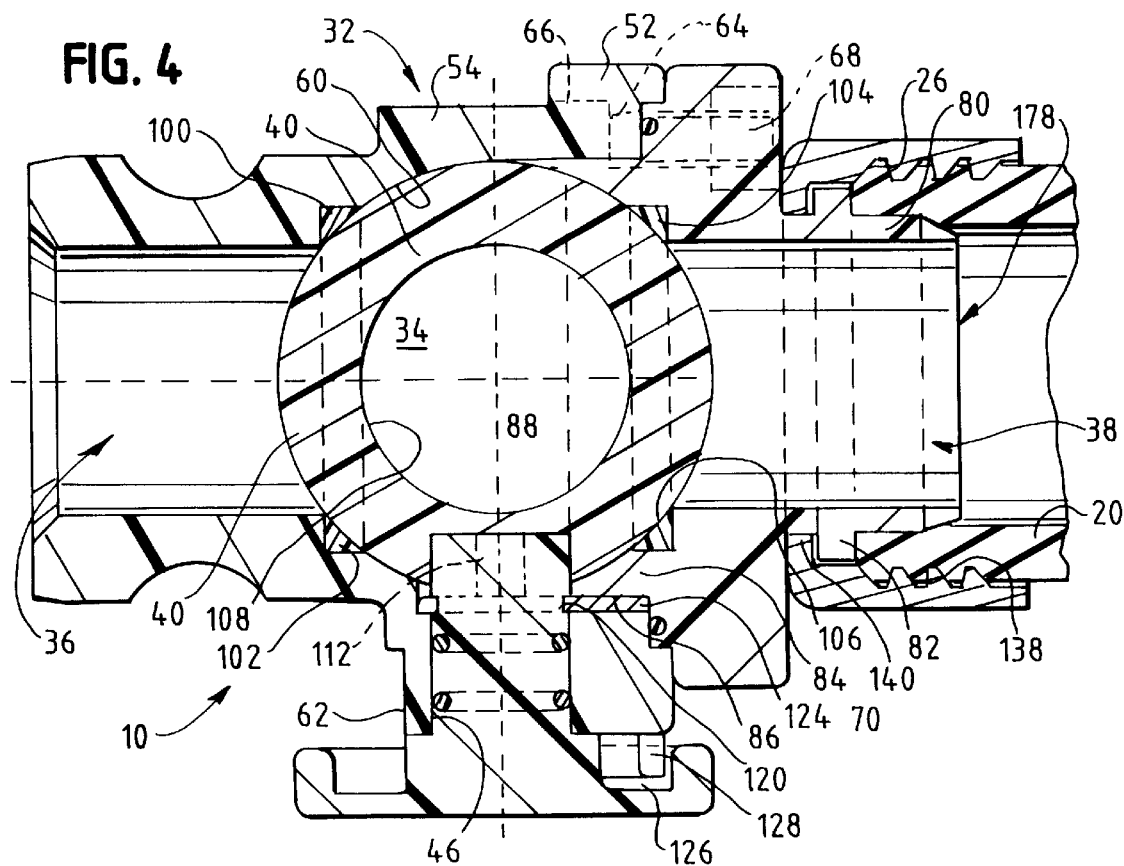
FIG. 4 is a sectional view taken along the line 4—4 of FIG. 2.
Figure 5:
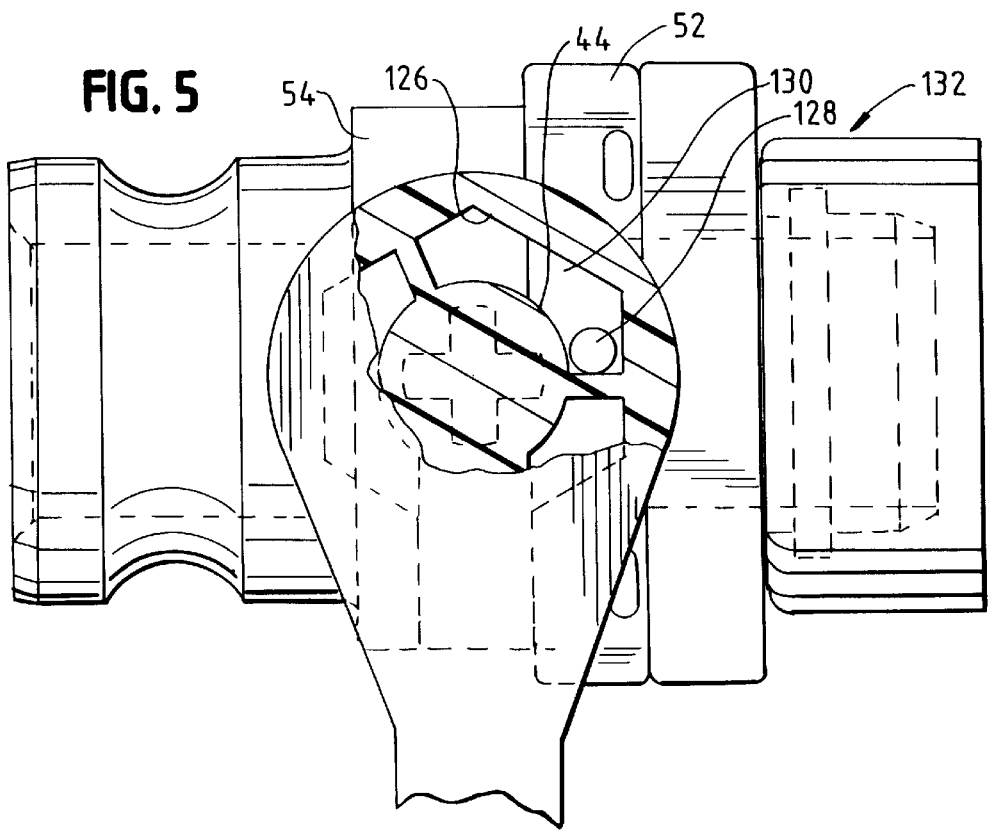
FIG. 5 is a side elevation view of the valve of FIG. 2.

Referring also to FIG. 4, the spout 20 is a tubular spout including an external thread 26. The valve 10 is adapted to be threadably connected to the spout 20, as described more particularly below. A hose 28 includes a cam level coupling element 30 for securing the hose 28 to the valve 10 in a conventional manner. As described, the valve 10 is selectively operated to empty the contents from the vessel 14 to the hose 20 for ultimate disposition.

With reference to FIGS. 2–5, the valve 10 comprises a plastic housing 32 having an interior chamber 34 connecting a front port 36 to a rear port 38. A generally spherical ball valve element 40 is rotationally supported in the interior chamber 34 for movement between a valve open position and a valve closed position. In the valve open position a cylindrical opening 108 in the valve element 40 is aligned with the front port 36 and the rear port 38. In the valve closed position, shown in the drawing, the opening is oriented in a plane perpendicular to a longitudinal axis of the valve 10 so that there is no fluid communication between the front port 36 and the rear port 38. A handle 42 includes an integral stem 44. The stem 44 extends through a transverse housing opening 46 to be operatively mated with the valve element 40, as described below, for selective rotation of the valve element 40 between the open and closed positions.

The housing 32 comprises a two-piece plastic housing having a front housing part 48 and a rear housing part 50. For simplicity herein, the longitudinal end of the valve 10 furthest from the IBC 14, in use, is referred to as the front portion, while the opposite end closest to the IBC is referred to as the rear portion.

Figure 6:
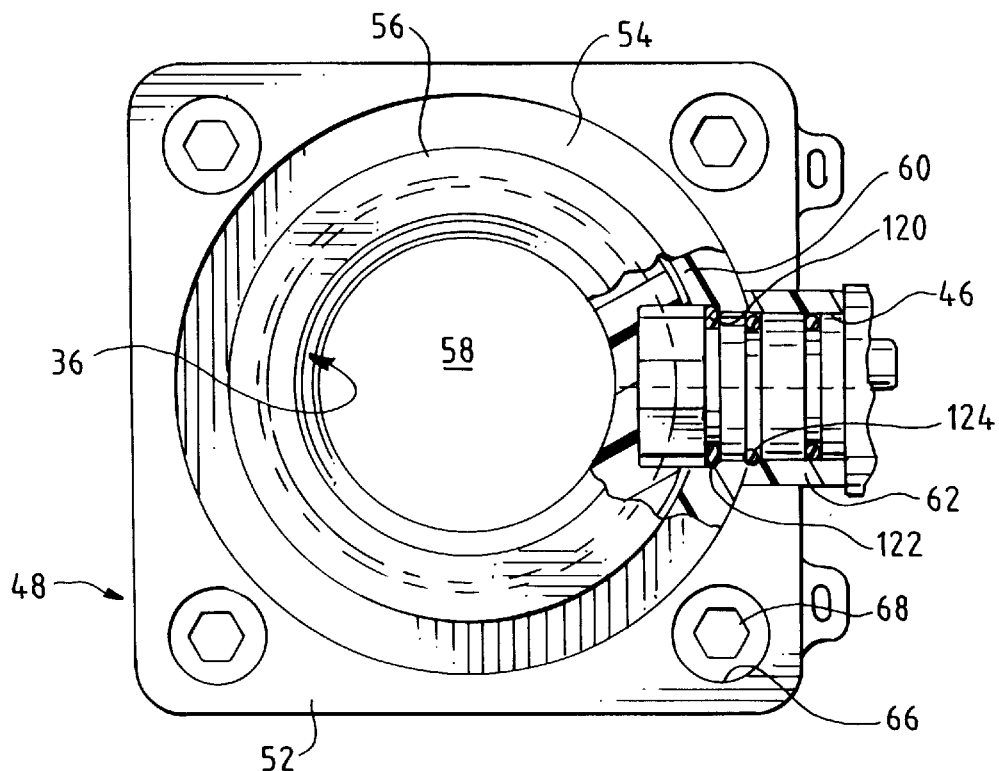
FIG. 6 is a rear elevation view of a front housing part of the valve of FIG. 2.
Figure 7:
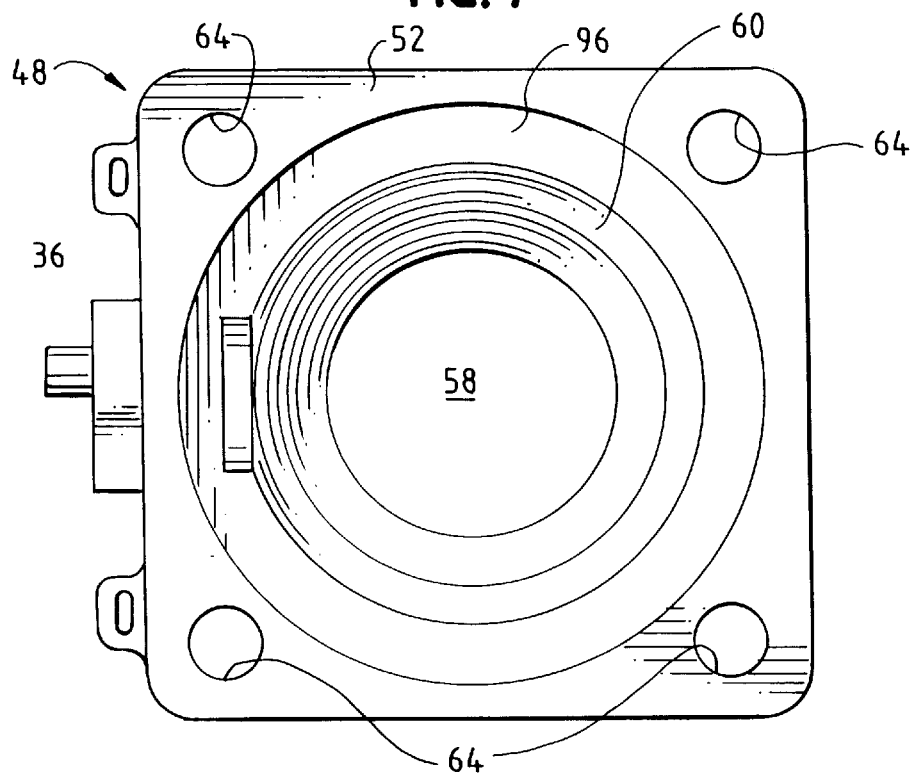
FIG. 7 is a front elevation view, with part shown in section, of the front housing part of FIG. 6 illustrating mounting of a handle to the housing.

The front housing part 48 is illustrated in detail in FIGS. 6 and 7. The front housing part 48 includes a front flange 52 connecting a cylindrical wall 54 to a front fitting 56. A throughbore 58 extends through the front housing part 48 and connects the rear port 36 to a generally spherical counterbore 60. The transverse opening 46 extends through a projection 62 secured to one side of the flange 52 and the wall 54. The opening 46 opens into the counterbore 60, as is particularly illustrated in FIG. 6.

The flange 52 is generally square-shaped, with the circular wall 54 generally centrally positioned thereon. Proximate each corner of the flange 52 is a through opening 64. The front side of the flange 52 includes a counterbore 66 coaxial with each throughbore 64. A bolt 68 is inserted into each counterbore 66 and extends through the corresponding opening 64 for securing the front housing part 48 to the rear housing part 50, as described more specifically below.

Referring to FIGS. 8 and 9, the rear housing part 50 is illustrated. The rear housing part 50 includes a rear flange 70 of a size and shape corresponding to the front flange 52. A throughbore 72 extends through the flange 70 at each corner thereof. A hexagonal counterbore 74 is coaxial with each throughbore 72 on the rear side thereof, as shown in FIG. 8. Each counterbore 74 is adapted to receive a nut 76 to threadably receive the bolt 68 for mounting the front housing part 48 to the rear housing part 50.

The rear flange is connected to a rear fitting 78 about the rear port 38. The rear fitting 78 comprises a rearwardly extending tubular neck 80 adapted to be received in the spout 20, as shown in FIG. 4. The neck 80 includes an annular ridge 82 proximate the flange 70.

Extending frontwardly from the rear flange 70 is a tubular sleeve 84. The tubular sleeve 84 includes an outer cylindrical wall 86 with an inner surface 88 being generally spherical, having a radius corresponding to that of the ball valve element 40, as shown in FIG. 4. A circular ridge 90 surrounds the tubular sleeve 84 and includes a circular groove 92 supporting an O-ring 94. The outer diameter of the circular ridge 90 corresponds to a circular groove 96 in the front housing part flange 52 surrounding the counterbore 60, see FIG. 7, to be received therein.

Figure 3:
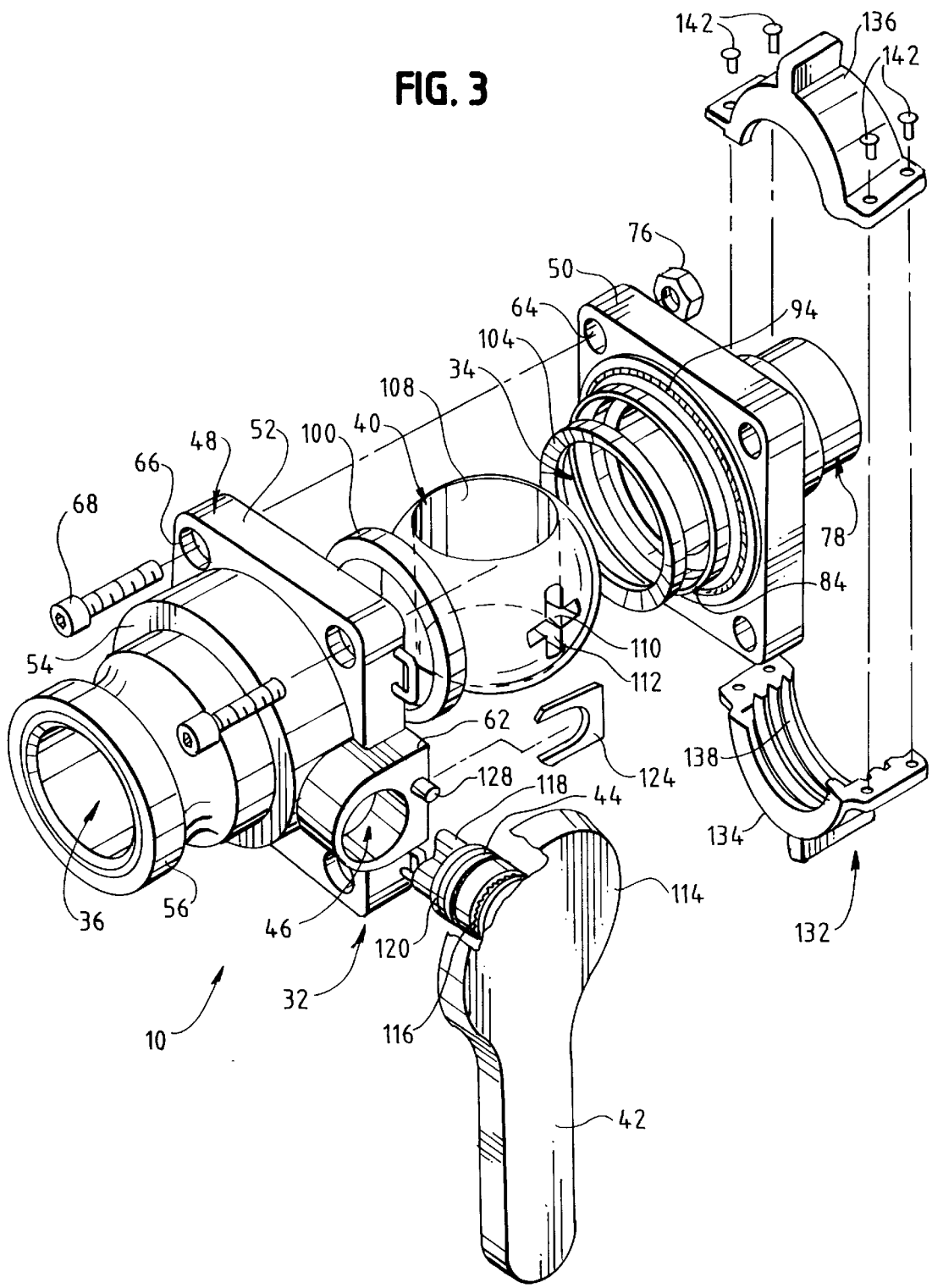
FIG. 3 is an exploded view of the valve of FIG. 2.

As particularly illustrated in FIGS. 3 and 4, the movable ball element 40 is captured within the spherical counterbore 60 of the front housing part 48 and the spherical inner wall 88 of the tubular sleeve 84. The ball element 40 is sealed in the front housing part 40 via a Teflon® front seal 100 mounted in a counterbore 102. Likewise, a rear Teflon® seal 104 is mounted in a counterbore 106 in the rear flange 70. As is apparent, the Teflon® seals 100 and 104 are generally annular to fit within the associated counterbores, but are machined to have a spherical seal surface adapted to the contour of the ball valve element 40.

The ball valve element 40 is generally spherical and includes the enlarged circular throughbore 108. A flat 110 is provided on one side of the ball valve element 40 in a plane parallel to a longitudinal axis of the throughbore 108. A groove 112 in the shape of a "+" extends into the ball valve element 40 at the flat 110. When the ball valve element 40 is positioned in the housing 32, the flat 110 is aligned with the transverse through opening 46 of the front housing part 48, as shown in FIG. 4.

The handle 42 is of a size and shape to be easily grasped by a user. The stem 44 extends inwardly from an enlarged head portion 114 through the opening 46. The stem 44 includes grooves supporting O rings 116 for sealing the stem 44 within the opening 46. A "+"-shaped adaptor 118 is at a distal end of the stem 44. The adaptor 118 is of a size and shape to be received in the valve element groove 112. An annular groove 120 in the stem 44 is located immediately adjacent the adaptor 118. A channel 122 is formed in the front housing part counterbore 60 surrounding the through opening 46. When the stem 44 is inserted in the opening 46, the annular groove 120 is positioned within the channel 122.

A U-shaped metal clip 124, see FIG. 3, is adapted to be positioned within the channel 122 and received in the groove 120 to retain the handle on the front housing part 48.

With the valve 10 assembled, the adapter 118 extends into the ball valve element groove 112. Rotation of the handle 42 causes corresponding rotation of the ball valve element 40. FIGS. 1–6 all illustrate the valve in the closed position. As is apparent rotation of the handle 42 in the clockwise direction will move the ball valve element ninety degrees to the open position (not shown).

The handle 42 includes a groove 126 on the inside of the head portion 114 surrounding the stem 44. A stop 128 extending outwardly from the projection 62 and extends into the groove 126. The stop 128 limits rotational movement of the handle to approximately 90° of rotation. The groove 126 is generally wider than the diameter of the stop 128 except at central portion 130, where it is slightly smaller. This provides an over-center locking arrangement so that the handle 42 is maintained at either side of center to selectively open or close the valve.

A two-piece plastic collar 132 is mounted to the rear fitting 78. Particularly, the collar 132 includes a first half 134 and a second half 136 of generally conventional construction in which the halves 134 and 136 are mated together and have an inner threaded surface 138 for threading to the spout threads 26 as illustrated in FIG. 4. An inwardly directed flange 140 is sandwiched between the annular ridge 82 and the rear flange 70 to retain the collar in position, yet permit rotation. The two collar halves 134 and 136 in accordance with the invention are of molded plastic construction and are secured together using rivets 142.

In accordance with the invention the housing 32 comprising the front housing part 48 and rear housing part 50 are made of twenty percent glass-filled polypropylene. The ball valve element 40 is of nylon construction. The O-rings 94 and 116 are made of Viton. The collar 132 is made of twenty percent glass-filled nylon. The clip 124 and rivets 142 are of metal. Thus, a substantial portion of the valve 10 is of lightweight materials.

By using the counterbore 66 in the front housing part flange 52 and the counterbores 74 in the rear housing part flange 70, the bolts 68 and nuts 76 are inset. The handle 42 is contained on the housing 32 with the internal clip 124 instead of an external bolt. Thus, it cannot easily be removed. By using the spherical surfaces within the interior chamber 34, particularly associated with the tubular sleeve 84 there are minimal internal voids in which products could collect. Likewise, as is particularly shown in FIG. 4, the rear housing part tubular sleeve 84 extends substantially into the front housing part counterbore 60 to provide reinforcement on impact. The two parts are not permitted to slide relative to one another in a transverse direction. The ball element 40 and interior chamber 34 are machined to provide the close fit. Finally, the O-ring 94 provides an improved seal between the front housing part 48 and the rear housing part 50.

Thus, the bulk container valve 10 provides substantial improvements over the prior art bulk container valves.

I claim:

1. A bulk container valve adapted for use with a bulk container having a tubular spout, the valve comprising:
    a plastic housing having an interior chamber connecting a front port to a rear port, the housing including a rear fitting about the rear port for connection to the spout, in use, and a front fitting about the front port;
    a valve element rotationally supported in the interior chamber for movement between a valve open position and a valve closed position;
    a handle including a stem, the stem extending through an opening in said housing and being operatively mated with the valve element for selective rotation of the valve element; and
    a fastener secured to the stem within the interior chamber for securing the handle to the housing.

2. The bulk container valve of claim 1 wherein the fastener comprises a U-shaped clip removably received on a slot on the stem within the interior chamber.

3. The bulk container valve of claim 1 wherein said housing comprises a two-piece housing having a front housing part and a rear housing part.

4. The bulk container valve of claim 3 further comprising a plurality of nuts and bolts securing the front housing part to the rear housing part.

5. The bulk container valve of claim 4 wherein the nuts and bolts are inset in counterbores provided in flanges of the front housing part and the rear housing part.

6. The bulk container valve of claim 3 further comprising an O-ring seal disposed between the front housing part and the rear housing part to seal the interior chamber.

7. The bulk container valve of claim 1 further comprising an O-ring seal surrounding the stem within the opening.

8. The bulk container valve of claim 1 further comprising a stop on said housing extending into a groove in the handle for limiting rotational movement of the handle.

9. The bulk container valve of claim 8 wherein the groove is narrower at a central portion to provide an over-center locking arrangement of the handle on the housing.

10. A bulk container valve adapted for use with a bulk container having a tubular spout, the valve comprising:
    a two-piece plastic housing having a front housing part and a rear housing part defining an interior chamber connecting a front port to a rear port, the front housing part including a front flange connecting a cylindrical wall to a front fitting about the front port, the cylindrical wall surrounding a counterbore, the rear housing part including a rear flange mateable with the front flange and connected to a rear fitting about the rear port for connection to the spout, in use, the rear flange having a tubular sleeve extending into the counterbore, the sleeve being in abutting engagement with the counterbore to reinforce the front housing part;
    a generally spherical valve element rotationally supported in the interior chamber captured between the counterbore and the tubular sleeve for movement between a valve open position and a valve closed position;
    a handle operatively mated with the valve element for selective rotation of the valve element; and
    securing means for securing the front flange to the rear flange to maintain the valve in assembled condition.

11. The bulk container valve of claim 10 wherein said counterbore is generally spherical and the sleeve includes a spherical interior surface wherein the interior chamber provides minimal internal voids surrounding the valve element.

12. The bulk container valve of claim 10 wherein the securing means comprises a plurality of nuts and bolts securing the front housing part to the rear housing part.

13. The bulk container valve of claim 12 wherein the nuts and bolts are inset in counterbores provided in the front flange and the rear flange.

14. The bulk container valve of claim 10 further comprising an O-ring seal disposed between the front flange and the rear flange to seal the interior chamber.

15. A bulk container valve adapted for use with a bulk container having a threaded tubular spout, the valve comprising:

a plastic housing having an interior chamber connecting a front port to a rear port, the housing including a rear fitting about the rear port for connection to the spout, in use, and a front fitting about the front port, the rear fitting comprising a tubular neck mateable with the spout;

a valve element rotationally supported in the interior chamber for movement between a valve open position and a valve closed position;

a handle operatively mated with the valve element for selective rotation of the valve element; and a plastic collar surrounding and rotatably secured to the tubular neck, the collar having threads engageable with corresponding threads on the spout for securing the valve to the container.

16. The bulk container valve of claim 15 wherein the housing comprises a two-piece plastic housing having a front housing part and a rear housing part defining the interior chamber, the front housing part including a front flange connecting a cylindrical wall to the front fitting, the cylindrical wall surrounding a counterbore, the rear housing part including a rear flange mateable with the front flange and connected to the rear fitting, the rear flange having a second tubular neck extending into the counterbore to reinforce the front housing part; and securing means for securing the front flange to the rear flange to maintain the valve in assembled condition.

17. The bulk container valve of claim 16 further comprising an O-ring seal disposed between the front housing part and the rear housing part to seal the interior chamber.

18. The bulk container valve of claim 15 wherein the collar comprises a two-piece plastic collar and further comprising means for securing the two pieces of the collar surrounding the neck.

19. The bulk container valve of claim 15 wherein the collar has an inwardly directed flange engaging an annular ridge on the neck to secure the collar to the neck.

20. The bulk container valve of claim 15 wherein the collar is of glass filled nylon construction.

* * * * *